March 3, 1970     A. E. ZYGIEL     3,498,371
HEAT TRANSFER DEVICE

Filed June 12, 1967     2 Sheets-Sheet 1

INVENTOR
ALFRED E. ZYGIEL

Richards, Harris + Hubbard

ATTORNEY

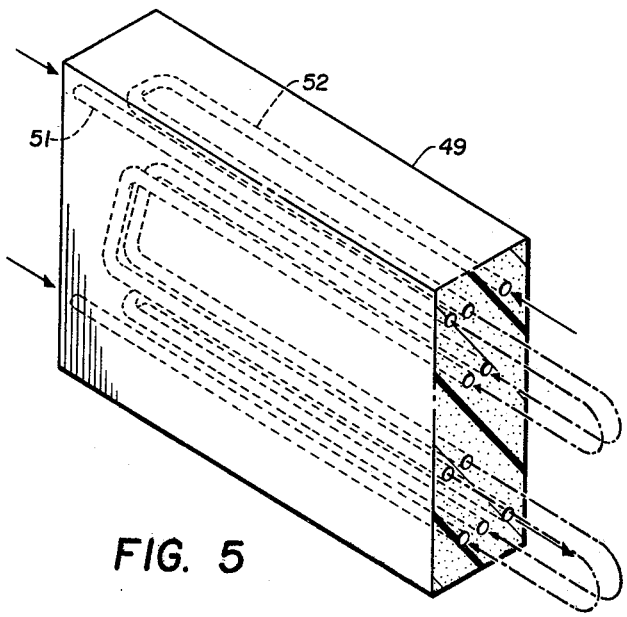
FIG. 5
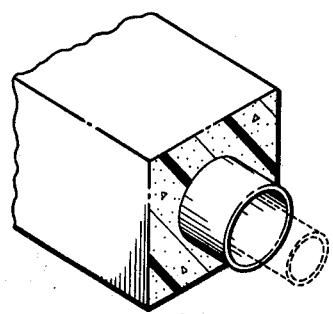
FIG. 6
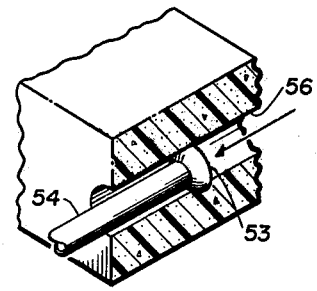
FIG. 7
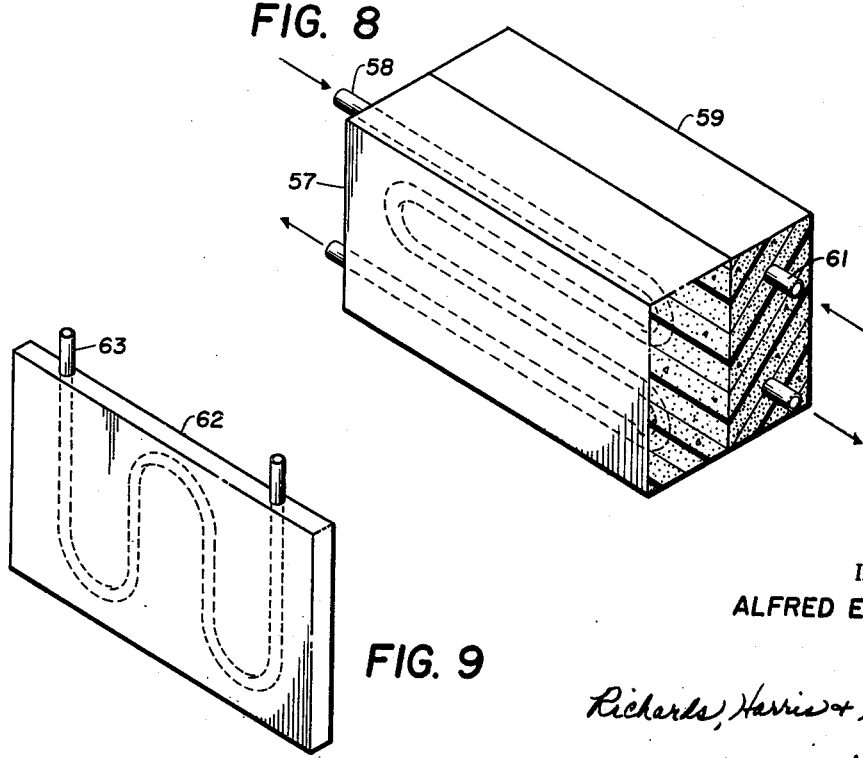
FIG. 8
FIG. 9
INVENTOR
ALFRED E. ZYGIEL
ATTORNEY United States Patent Office 3,498,371
Patented Mar. 3, 1970

3,498,371
HEAT TRANSFER DEVICE
Alfred E. Zygiel, 2510 Hillsboro,
Dallas, Tex. 75228
Filed June 12, 1967, Ser. No. 645,436
Int. Cl. F28d 7/02; F28f 3/12; B29c 17/04
U.S. Cl. 165—164
9 Claims

ABSTRACT OF THE DISCLOSURE

Heat transferring apparatus cast from a resinous metallic composition and having a plurality of passages formed therein. The resinous metallic composition includes a base material, such as an epoxy resin, mixed with a solidifying hardener and metallic particles to enhance the heat transferring abilities of the solidified resin. Individual heat exchanger passages are formed by pressurizing flexible tubing arranged in the desired configuration during the solidifying process of the resinous metallic composition.

BACKGROUND OF THE INVENTION

Heat exchangers in general use today consist of complicated arrangements of metallic tubes soldered together into a continuous path. The manufacture of such complicated piping arrangements is difficult and leaks at faulty solder connections are common. Further, the solder connections loosen from the continuous vibrational environment in which many heat exchangers are used.

In some heat exchangers, the metallic tubes are surrounded by metal fins in an attempt to make the most efficient use of available heat conducting surfaces. These metallic fins are themselves difficult to manufacture and are not too efficient. In other heat exchanger applications, the metallic tubes are wrapped in contact with the outer surface of a container, the contents of which are to be heated or cooled. Even using the most flexible metallic tubing, the area of contact between the tubing and the container is relatively small resulting in an inefficient heat exchanging device.

In accordance with this invention, the passages of a heat exchanger are formed into a resinous metallic composition. Where one fluid is used to cool or heat another, multiple passages are easily formed. The resinous metallic composition provides a good thermal conducting path from one passage to another thereby resulting in an efficient heat exchanger.

In addition to providing an efficient multiple passage heat exchanger, a heat exchanger in accordance with this invention is relatively simple to manufacture. The passages are formed in the resinous metallic composition as it solidifies thereby eliminating the need for an extensive soldering operation. Since there are no connections in the heat exchanger tubes, the problem of leakage due to vibration is not present.

The resinous metallic composition used in the heat exchangers of this invention consists of a base material mixed with a hardener to form a complex, amorphous mixture, having no definite melting point and showing no tendency to crystallize. During the mixing stage, metallic particles are mixed with and suspended in the base and hardener mixture. As the mass solidifies the metallic particles are frozen in position scattered throughout the heat exchanger body. The metallic particles are of a material having good thermal conductivity, and when frozen in the resinous mass, provide a heat exchanger body that itself has good thermal conductivity.

SUMMARY OF THE INVENTION

A heat exchanger including the novel features described in the claims and having a body of a solidified resinous material composition with one or more passages formed therein. The resinous metallic composition is a mixture of a resinous base material, a hardener for mixing said base material to form a complex, amorphous mixture, having no definite melting point and showing no tendency to crystallize, and metallic particles mixed with and suspended in said base and hardener mixture.

A more complete understanding of the invention and its advantages will be apparent from the specification and claims and from the accompanying drawings illustrative of the invention.

BRIEF DESCRIPTION OF THE DRAWINGS

FIGURE 5 is a two passage heat exchanger having parallel tubes molded into the body;

FIGURE 6 shows a method of forming the passages in the heat exchanger of FIGURE 5 using flexible tubing;

FIGURE 7 is an illustration of one method of removing the flexible tubing used in forming the passages of the heat exchanger of FIGURE 5;

FIGURE 8 shows a two passage heat exchanger where one passage is formed in a block containing one type of metal particles and the other passage is formed in a block containing another type of metal particles; and FIGURE 9 shows a single tube heat exchanger for use in heating or cooling large volumes such as in a bath.

DESCRIPTION OF THE PREFERRED EMBODIMENT

Figure 1:
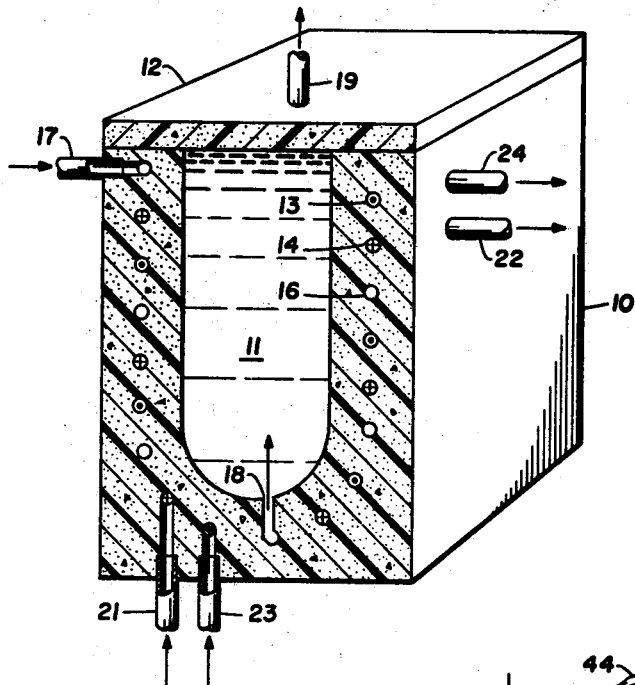
FIGURE 1 is an oblique view in section of a reservoir heat exchanger having three independent fluid passages.

Referring to FIGURE 1, there is shown a reservoir type heat exchanger having a housing 10 of a resinous metallic composition. A reservoir 11 is formed in the housing 10 and capped by means of a plate 12, also of a resinous metallic composition. Formed into the walls of the housing 10 are three independent passages 13, 14 and 16. The passage 16 (identified by the open circles) has an inlet 17 and an outlet 18 opening into the reservoir 11. Fluid enters the inlet 17 and circulates through the walls of the housing 10 in the passage 16 and into the reservoir 11 through outlet 18. The fluid is withdrawn from the reservoir 11 by means of a pipe 19 in the cap 12. A second fluid, such as a cooling fluid, enters the housing 10 through a pipe 21, circulates through the passage 14 (identified by the circled cross), and leaves the housing at a pipe 22. A third fluid, possibly a heating fluid, enters the housing 10 by means of a pipe 23, circulates through the passage 13 (identified by concentric circles), and leaves the housing through a pipe 24.

A heat exchanger of the type shown in FIGURE 1 finds many uses, for example, water entering the pipe 17 is cooled as it circulates through the passage 16 by means of a cooling fluid being circulated through the passage 14. Water cooled as it circulates through the passage 16 is maintained in its chilled condition upon being stored in the reservoir 11. It is also possible for the water entering the pipe 17 to be heated as it circulates through the passage 16 by means of a heated fluid circulating through the passage 13. Again, the heated water is maintained in its heated condition in the reservoir 11. It should be apparent that a fluid circulating in the passage 14 can be used to chill two different fluids circulating in the passages 13 and 16, respectively.

In the prior art heat exchanges of the type shown in FIGURE 1, each of the three passages are formed independently by a complex and time consuming manufacturing process, such as soldering together preformed copper tubing. However, in accordance with the present invention, the passages 13, 14 and 16 and the reservoir 11 are simultaneously formed when casting the housing 10. The housing 10 is formed from a composition of a resinous base material and metallic particles mixed with and suspended in the resinous base material and frozen into place throughout the housing 10 as the base material solidifies. The metallic particles have good thermal conducting properties and can be either in the form of powder, chips or spheres. Some of the better materials for use as metallic particles to be mixed with the resinous base material are aluminum, copper, brass, stainless steel, and iron. The particular type of metallic particles used in any given heat exchanger depends on its application. For example, if corrosive fluids are to be circulated through any of the passages 13, 14 or 16 of the heat exchanger of FIGURE 1, stainless steel particles are preferred. The amount of metallic particles mixed with the resinous base material also depends on the use of a particular heat exchanger. However, it has been found that the use of metallic particles in excess of about 80% by weight of the total mix results in an unsatisfactory housing 10. A composition with metallic particles in excess of about 80% is structurally weak due to the small amount of resinous material available to bind the metal particles together. On the lower end, a composition having less than about 15% by weight of metallic particles results in a heat exchanger with poor thermal conducting properties.

The resinous base material is also selected after considering the application of a particular heat exchanger. Some of the more common resinous materials are the epoxy resins, the polyester resins, silicone resins, melamine resins, furane resins, resorcinol resins, and the phenolic resins. Generally, the epoxy resins used today are linear polymers made by condensing epichlorhydrin with polyhydroxide compounds. These resins are stable for long periods and are cross-linked by the action of a curling agent through their epoxy or hydroxyl groups and result in a thermosetting product. Many curling agents are available, some of the most common are amines, or amine derivatives, dicarboxylic acid anhydrides, other resins (e.g. phenolic, polymide, polysulfide) and catalysts. Cured epoxy resins have excellent resistance to organic solvents and inorganic materials and adhere to many materials including metals, such as those listed above. Because there is no volatile loss during the curing process, a cured epoxy resin product is dimensionally stable.

The polyester resins also exhibit dimensionally stable characteristics. Many of the commercially available polyester resins comprise an unsaturated polymer the chemical chain of which has been built up by a polyesterification process, for example, a glycol is heated with a dibasic acid thereby producing a linear polyester. The polyester resins are also made from a poly-unsaturated ester monomer partially polymerized to produce a polymer containing residues of unsaturation. Almost any of the common compatible unsaturated organic compounds which polymerize alone, or copolymerize with other reactive materials, may be used in the production of unsaturated polyesters. A few of the more common monomers are methyl methacrylate, vinyl acetate, vinyl phenol, and ethylacrylate. A catalyst is added to the resin to initiate polymerization shortly before use. An accelerator is also sometimes added to the catalyzed resin to enable the polymerization reaction to proceed at a lower temperature and a greater rate. A few of the more common catalysts used with polyester resins are peroxides, hydroperoxides, and reducing agents.

The silicone resins are thermosetting and exhibit considerable resistance to high temperatures when cured. Silicone resins are available as solutions in tolulene or other aromatic solvents; they are semi-organic compounds with chemical chains of alternative silicon and oxygen atoms and are inert materials due to the lack of affinity of the polysiloxane molecule for other materials. A silicone resin has the property of being curable without the use of a catalyst. The melamine resins, the furane resins and the resorcinol resins are useful in some specific applications; they are all recently developed resins and their properties are not fully understood. A typical phenolic resin is the result of a phenyl-formaldehyde reaction that is a combination of a condensation and polymerization. There are many other resins available that are too numerous to mention each having properties useful in specific heat exchanger applications.

The mixing of the metallic particles with the resinous base material is a straight forward process. It is important that a full and adequate mixing of the resin, catalyst and accelerator, and metallic particles take place. For satisfactory results, it would appear that some mechanical mixing means is necessary, if an adequate mixing is to be achieved. If the resin includes a solvent, adequate precautions are necessary in the use of such materials.

Figure 2:
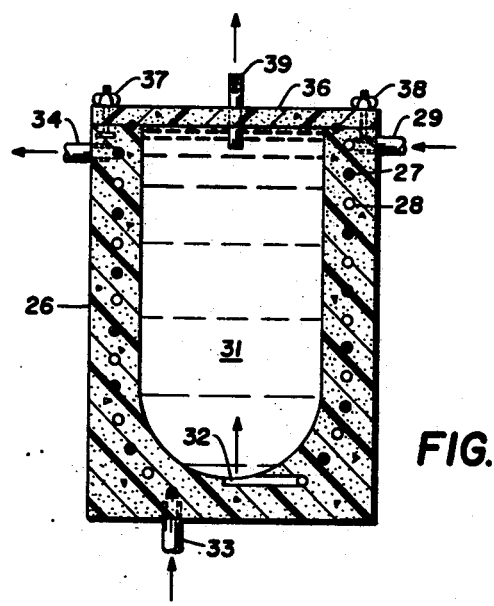
FIGURE 2 is a sectional view of a reservoir type heat exchanger having two independent fluid passages.

Referring to FIGURE 2, there is shown another reservoir type heat exchanger including a housing 26 of a solidified resinous metallic composition. The resinous metallic composition can be any of the above-described resins mixed with one or more of the listed metals. Whereas in FIGURE 1 the housing 10 included three separate passages, the housing 26 of FIGURE 2 includes a passage 27 and a passage 28. A liquid circulating through the passage 28 enters by means of a pipe 29 and is discharged into a reservoir 31 through an opening 32. A heat exchanger of this type is particularly well suited for use as a water cooler. As such, the passage 27 has a refrigerant circulating therein which enters by means of a pipe 33 and exits by means of a pipe 34. The reservoir 31 is capped with a plate 36 bolted to the housing 26 by means of wing nuts 37 and 38. Liquid is discharged from the reservoir 31 by means of a pipe 39 extending through the plate 36. If it is necessary to prevent the liquid in the passage 28 and the reservoir 31 from coming in contact with the resinous metallic composition of the housing 26, a nylon or Teflon liquid can be blown through the passage 28 and into the chamber 31 to form a protective coating.

Figure 3:
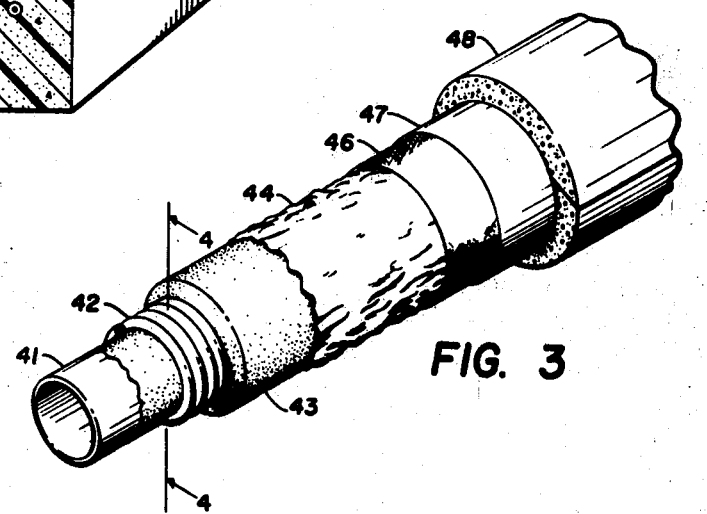
FIGURE 3 is an oblique view of a tube type heat exchanger having a cooling coil surrounding a main conduit.
Figure 4:
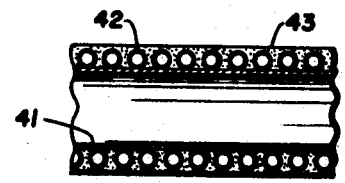
FIGURE 4 is a cross section of the heat exchanger of FIGURE 3 taken along the line 4—4.

Referring to FIGURE 3, there is shown a straight pipe heat exchanger wherein the cooled or heated liquid flows through a stainless steel pipe 41. Formed around the pipe 41 is a helical shaped cooling coil 42, the individual turns of which are in contact with the pipe 41 and spaced apart, as shown in FIGURE 4. A resinous metallic filler material 43 is pressure molded around the coil 42 such as shown in FIGURE 3. An aluminum foil 44 and a Fiberglas cloth 46 are wrapped around the filler 43 preferably before the resinous metallic composition solidifies. A vapor barrier 47 is placed around the Fiberglas 46 and a high density insulation 48 cover the vapor barrier 47.

Prior to this invention, pipe type heat exchangers were wrapped with a layer of insulation around the coil 42 with the result that only a small area of the individual turns were in actual thermal contact with the pipe 41. In accordance with this invention, the resinous metallic composition surrounding the coil 42 effectively places the entire surface of a turn in contact with the pipe 41. The good thermal conductivity of the metallic particles transfer the thermal energy in the coil 42 to the pipe 41 and the thermal insulation, including the foil 44, the Fiberglas cloth 46, the vapor barrier 47, and the high density insulation 48 add to the efficiency.

Referring to FIGURE 5, there is shown a simple two passage heat exchanger including a body 49 having two independent passages 51 and 52. The body 49 is formed by pouring a resinous metallic composition into a mold of the desired shape. After the composition has solidified the mold is removed and the heat exchanger is completely formed. The passages 51 and 52 are formed during the molding process by means of pressurized flexible tubing.

A flexible tubing, such as a nylon tubing, is arranged in the desired shape and distribution of the passages in the mold into which the body 49 is to be formed. For a two passage heat exchanger, two flexible tubes are arranged in the desired shape and distribution, such as shown in FIGURE 5, independent of each other. The resinous metallic composition is prepared by using any of the previously mentioned resins and one or more of the listed metals and poured into the mold containing the flexible tubing. After the resinous metallic composition has been poured into the mold and before it solidifies, tubing used to form the passages 51 and 52 is pressurized thereby causing it to expand to a diameter larger than normal, such as shown in FIGURE 6, to the desired diameter of the finished passages. The tubes are maintained in a pressurized condition until the resinous metallic composition has completely solidified. After solidification, the tubing is depressurized and allowed to return to its normal diameter which is somewhat smaller than the now formed passages 51 and 52. Next the flexible tubing is removed from the body 49 leaving a heat exchanger with the desired number of fluid passages each independent of the other and completely free of troublesome solder connections.

Referring to FIGURE 7, there is shown one method of removing the flexible tubing from the finished passages. An expanding flexible cup 53 is affixed to the end of the tubing 54 and allowed to expand to the diameter of the passage 56. The passage 56 is pressurizer on the side of the disk opposite the tube 54 and the tubing is forceably ejected from the passage.

It should be apparent that a heat exchanger of the type shown in FIGURE 5 is simple to manufacture and will be substantially leak proof since the passages 51 and 52 are molded into the body 49 when it is formed. Although only two independent passages have been shown in FIGURE 5, it should be understood that any number of such passages can be molded into the body during its formation.

Referring to FIGURE 8, there is shown a heat exchanger wherein a first body 57 containing a passage 58 is cemented to a second body 59 containing a pasage 61. A heat exchanger of the type shown in FIGURE 8 has application to installations where one of the circulating fluids is highly corrosive, such as salt water in marine applications. The body 57, for example, is molded from a resinous metallic composition containing stainless steel particles for resistance to corrosion, and the body 59 is formed from a resinous metallic composition containing aluminum particles for good thermal conductivity. The body 57 is molded separate from the body 59 by the process described with reference to FIGURE 5 after which they are cemented together with a material having good thermal conductivity. The resulting overall mass having a good thermal conductive path between the passage 58 and 61.

Referring to FIGURE 9, there is shown an embodiment of the invention used for cooling large bodies of liquid. A body 62 is formed from a resinous metallic composition and includes a single passage 63. In operation, the body 62 is lowered into a liquid with a refrigerant circulating through the passage 63. One particular application for the device shown in FIGURE 9 is the manufacture of ice.

It should be apparent that where reference was made to either a refrigerant or a heated liquid, they can be readily substituted for each other. Heat exchangers made from a resinous metallic composition have been used up to 300 degrees F. without adverse effects. They have been cycled from a temperature of −15 degrees F. to a temperature of +50 degrees F. in approximately three minutes, and have remained dimensionally stable. Also, by the proper selection of a resinous base material, it is possible for a heat exchanger in accordance with this invention to be used with cryogenic fluids. Also, it should be understood that whenever the term "fluid" has been used, it is intended to include gases and liquids.

While several embodiments of the invention, together with modifications thereof, have been described herein and shown in the accompanying drawings, it will be evident that various further modifications are possible without departing from the scope of the invention.

What is claimed is:

1. A heat exchanger comprising a monolithic cast body of a solidified self-supporting resinous metallic composition wherein metallic particles comprise not more than 80% and not less than 15% by weight of the composition, and a plurality of independent passages formed wholly within said composition and defined during the formation of said body by the solidification of the resinous metallic composition, each passage outlining a continuous tortuous path within said body for a fluid to circulate a distance within said body greater than any one single body dimension independent of fluids in other passages for heat transfer therebetween.

2. A heat exchanger as set forth in claim 1 wherein the resinous metallic composition includes:
   a resinous base material,
   a harder for mixing with said base material to form a complex, amorphous mixture, having no definite melting point and showing no tendency to crystallize, said metallic particles mixed with and suspended in said base and hardener mixture.

3. A heat exchanger as set forth in claim 1 wherein said metallic particles are selected from the group consisting of aluminum, copper, brass, stainless steel, and iron.

4. A heat exchanger as set forth in claim 3 wherein said resinous base material is an epoxy resin.

5. A heat exchanger as set forth in claim 3 wherein said resinous base material is a polyester resin.

6. A heat exchanger as set forth in claim 3 wherein said resinous base material is a silicon resin.

7. A heat exchanger as set forth in claim 3 wherein said resinous base material is a melamine resin.

8. A heat exchanger as set forth in claim 3 wherein said resinous base material is a furane resin.

9. A heat exchanger comprising a monolithic cast body of a solidfied self-supporting resinous metallic composition wherein metallic particles comprise not more than 80% and not less than 15% by weight of the composition including a passage formed wholly within said composition and defined during the formation of said body by the solidification of the resinous metallic composition, said passage outlining a continuous tortuous path that allows a fluid circulating therein to travel within said body a distance greater than any one single body dimension.

(References on following page)

References Cited

UNITED STATES PATENTS

| | | | |
|---|---|---|---|
| Re. 19,701 | 9/1935 | Wilson | 165—165 |
| 1,571,068 | 1/1926 | Stancliffe | 165—165 |
| 2,896,135 | 7/1959 | Briggs | 317—234 |
| 2,238,661 | 4/1941 | Shaeffer | 165—169 |
| 2,410,952 | 11/1946 | Lighton | 165—168 X |
| 2,992,545 | 7/1961 | Walker | 165—169 X |
| 3,132,989 | 5/1964 | Stenerson | 165—180 X |
| 3,239,000 | 3/1966 | Meagher | 165—180 X |
| 3,246,689 | 4/1966 | Remde et al. | 165—180 X |
| 1,799,626 | 4/1931 | Keith | 165—172 X |
| 2,313,379 | 3/1943 | Wood | 174—35 X |
| 2,499,448 | 3/1950 | Axelson et al. | 165—165 |
| 2,611,585 | 9/1952 | Boling | 165—164 |
| 2,799,793 | 7/1957 | De Cain | 174—35 X |
| 2,897,252 | 7/1959 | Martin | 174—35 |
| 3,013,104 | 12/1961 | Young | 317—100 X |
| 3,269,422 | 8/1966 | Matthews et al. | 165—164 X |
| 3,335,757 | 8/1967 | Lynch | 165—180 X |

FOREIGN PATENTS

| | | |
|---|---|---|
| 942,457 | 11/1963 | Great Britain. |
| 1,376,352 | 9/1964 | France. |
| 558,124 | 12/1943 | Great Britain. |
| 938,372 | 10/1963 | Great Britain. |
| 1,009,332 | 11/1965 | Great Britain. |

ROBERT A. O'LEARY, Primary Examiner

ALBERT W. DAVIS, JR., Assistant Examiner

U.S. Cl. X.R.

138—111, 140; 165—165, 168, 169, 180; 264—88

PO-1050
(5/69)

UNITED STATES PATENT OFFICE
CERTIFICATE OF CORRECTION

Patent No. 3,498,371                    Dated March 3, 1970

Inventor(s) Alfred E. Zygiel

It is certified that error appears in the above-identified patent and that said Letters Patent are hereby corrected as shown below:

Col. 2, line 17 (page 3, line 6), after "mixing" insert -- with --

Col. 6, line 47 (Claim 1, line 3), "harder" should be -- hardener

SIGNED AND
SEALED
JUL 14 1970

(SEAL)
Attest:

Edward M. Fletcher, Jr.
Attesting Officer

WILLIAM E. SCHUYLER, JR.
Commissioner of Patents